US010306901B2

(12) United States Patent
Shimoda et al.

(10) Patent No.: US 10,306,901 B2
(45) Date of Patent: Jun. 4, 2019

(54) SUGAR-PICKLED VEGETABLE FOODS, SUGAR-PICKLING LIQUID USED THEREFOR, AND METHOD FOR PRODUCING SAID FOODS

(71) Applicant: MITSUBISHI SHOJI FOODTECH CO., LTD., Tokyo (JP)

(72) Inventors: Fuyuki Shimoda, Shizuoka (JP); Yuki Soejima, Shizuoka (JP); Megumi Satomi, Shizuoka (JP)

(73) Assignee: MITSUBISHI SHOJI FOODTECH CO., LTD., Tokyo (JP)

( * ) Notice: Subject to any disclaimer, the term of this patent is extended or adjusted under 35 U.S.C. 154(b) by 0 days.

(21) Appl. No.: 15/526,634

(22) PCT Filed: Nov. 13, 2015

(86) PCT No.: PCT/JP2015/082040

§ 371 (c)(1),
(2) Date: Sep. 14, 2017

(87) PCT Pub. No.: WO2016/076431

PCT Pub. Date: May 19, 2016

(65) Prior Publication Data

US 2018/0027831 A1 Feb. 1, 2018

(30) Foreign Application Priority Data

Nov. 14, 2014 (JP) ................................ 2014-231864

(51) Int. Cl.

| | |
|---|---|
| ***A23B 7/14*** | (2006.01) |
| ***A23L 3/34*** | (2006.01) |
| ***A23L 19/00*** | (2016.01) |
| ***A23L 19/20*** | (2016.01) |

(52) U.S. Cl.

CPC *A23B 7/14* (2013.01); *A23L 3/34* (2013.01); *A23L 19/00* (2016.08); *A23L 19/20* (2016.08); *A23V 2002/00* (2013.01)

(58) Field of Classification Search

CPC . A23B 7/14; A23L 19/00; A23L 19/20; A23L 3/34; A23L 3/3463
USPC .......................... 426/89, 102, 103, 615, 658
See application file for complete search history.

(56) References Cited

U.S. PATENT DOCUMENTS

| | | | |
|---|---|---|---|
| 4,408,041 | A | 10/1983 | Hlrao et al. |
| 4,917,916 | A | 4/1990 | Hlrao et al. |
| 2006/0013925 | A1 * | 1/2006 | Bauman et al. |
| 2006/0172042 | A1 | 8/2006 | Clemons |
| 2006/0286204 | A1 | 12/2006 | Arai et al. |

FOREIGN PATENT DOCUMENTS

| | | | |
|---|---|---|---|
| JP | S54-135256 | A | 10/1979 |
| JP | S57-134498 | A | 8/1982 |
| JP | 62000244 | * | 1/1987 |
| JP | S62-000244 | A | 1/1987 |
| JP | H07-123994 | A | 5/1995 |
| JP | H10-033119 | A | 2/1998 |
| JP | 10-33119 | * | 10/1998 |
| JP | H11-341964 | A | 12/1999 |
| JP | 2007-020564 | A | 2/2007 |
| JP | 2007-053986 | A | 3/2007 |
| JP | 2008-530987 | A | 8/2008 |
| WO | WO-1999/055173 | A1 | 11/1999 |
| WO | WO-2006/084104 | A2 | 8/2006 |

OTHER PUBLICATIONS

International Search Report issued in Application No. PCT/JP2015/082040, dated Feb. 16, 2016.

* cited by examiner

*Primary Examiner* — Helen F Heggestad
(74) *Attorney, Agent, or Firm* — Michael Best & Friedrich LLP

(57) ABSTRACT

To provide sugar preserved vegetable foods containing sugar alcohol characterized in displaying a quality similar to that of conventional candied foods while being sugar free or with low sugar (reduced sugar).

Sugar preserved vegetable foods, immersion syrup used therefor and method for manufacturing said vegetable foods, wherein 50% or more of the saccharides contained in the sugar preserved vegetable foods consists of sugar alcohol, this sugar alcohol comprising 50% to less than 99.5% maltitol, 0.5% to less than 50% sorbitol, and 5% or less of sugar alcohol with a degree of polymerization of 3.

9 Claims, No Drawings

SUGAR-PICKLED VEGETABLE FOODS, SUGAR-PICKLING LIQUID USED THEREFOR, AND METHOD FOR PRODUCING SAID FOODS

TECHNICAL FIELD

The present invention relates to sugar preserved vegetable foods that contain sugar alcohol, the immersion syrup used therefor and the method for manufacturing these vegetable foods.

BACKGROUND ART

Sugar preserved foods made of fruits and vegetables, like pineapple, mango, angelica, etc., preserved in sucrose and dried have been existing for a long time. These sugar preserved foods are made by immersing the foods into a sucrose syrup so that the moisture thereof is desiccated by osmotic pressure of the sucrose syrup, and have been widely popular as foods with an improved storage stability.

However, these sugar preserved foods use a lot of sucrose. Recently, with the increased awareness for sugar free products, low calorie consciousness, as well as the rise in diabetes, sugar preserved foods in which a part or all of the sucrose is replaced by another sweetener have been sought after.

Past disclosed examples for such foods include a method consisting in immersing the food into melt sugar alcohol so as to dehydrate the food and obtain food which surface is covered with sugar alcohol (Japanese Patent Publication Before Examination No. S62(1987)-244), a method wherein beans for fancy beverages are immersed into a dilute saline solution before soaking the beans into a sweetener solution (Japanese Patent Publication Before Examination No. H10 (1998)-33119), etc.

However, as the method of JPS62(1987)-244 A employs sugar alcohol that has been heated up to melting point, the food is dehydrated of almost all moisture, like being fried in oil and is a far cry from sucrose preserved foods.

In addition, a method for manufacturing sugar preserved foods consisting of beans for fancy beverage which are normally not meant to be eaten such as disclosed in JPH10 (1998)-33119 A, could not be adopted as it is. Namely, there is no need of a manipulation for removing the bitterness of the beans for fancy beverages, and one did not obtain products of satisfactory quality with a sugar preservation process taking this example as reference, or when referring to manufacturing procedures of ordinary sugar preserved foods for manufacturing. More precisely, sugar preserved foods were manufactured by immersing the sugar preserved food raw material in a sugar alcohol syrup in which sucrose had been replaced by sugar alcohol, then dried. The finished sugar preserved foods were however sticky even after drying, and were clearly different from products manufactured using sucrose.

SUMMARY OF THE INVENTION

Problem to be Solved by the Invention

In other words, the present invention aims at providing sugar preserved vegetable foods containing sugar alcohol characterized in displaying a quality similar to that of conventional sucrose preserved foods ("sucrose preserved foods" means sugar preserved foods using sucrose, the same applies hereinafter) while being sugar free (sucrose free) or with low sugar (reduced sucrose).

Means to Solve the Problem

As a result of diligent research for solving the above problem, the present inventors have found that this problem can be solved when sugar alcohol as saccharide contained in the sugar preserved vegetable foods has a specific component ratio, have furthermore specified the component ratio of sugar alcohol contained in the immersion syrup for manufacturing the concerned vegetable foods, also achieved to provide a method for manufacturing the vegetable foods and completed the present invention.

Namely, the present invention consists of (1) Sugar preserved vegetable foods that include sugar alcohol as saccharide contained therein, this sugar alcohol comprising 50% to less than 99.5% maltitol, 0.5% to less than 50% sorbitol, and 5% or less of sugar alcohol with a degree of polymerization of 3.

(2) The sugar preserved vegetable foods as described in the above (1), wherein 50% or more of the saccharides contained in the sugar preserved vegetable foods is sugar alcohol.

(3) An immersion syrup for sugar preserved vegetable foods that includes sugar alcohol as saccharide contained therein, this sugar alcohol comprising 50% to less than 99.5% maltitol, 0.5% to less than 50% sorbitol, and 5% or less of sugar alcohol with a degree of polymerization of 3.

(4) The immersion syrup for sugar preserved vegetable foods as described in the above (3), wherein 50% or more of the saccharides contained in the immersion syrup for sugar preserved vegetable foods is sugar alcohol.

(5) A method for manufacturing sugar preserved vegetable foods, wherein drying is conducted after a process of immersing a raw material of sugar preserved vegetable foods into the immersion syrup for sugar preserved vegetable foods as described in the above (3) or (4).

(6) The method for manufacturing sugar preserved vegetable foods as described in the above (5), wherein the above process of immersion is characterized in comprising (a) a process of immersing the raw material of sugar preserved vegetable foods into the immersion syrup for sugar preserved vegetable foods as described in the above (3) or (4), followed by (b) a process of immersion into an immersion syrup for sugar preserved vegetable foods having a sugar concentration higher than that of the immersion syrup for sugar preserved vegetable foods used in process (a).

(7) The method for manufacturing sugar preserved vegetable foods as described in the above (6), wherein the process (b) is conducted at least twice.

(8) The method for manufacturing sugar preserved vegetable foods as described in any of the above (5) to (7), wherein the immersion syrup for sugar preserved vegetable foods has a sugar concentration of 30 degrees Brix to 85 degrees Brix.

(9) The method for manufacturing sugar preserved vegetable foods as described in any of the above (5) to (8), wherein a process of sprinkling a powdered saccharide is conducted after the immersion process.

The vegetable foods of the present invention refer to plants such as vegetable or fruits, etc., that can be eaten after being sugar-preserved and dried. Representative examples include vegetables and fruits used for dry fruits, confectionery, etc. Specific examples of vegetables include angelica, rhubarb, butterbur, ginger, burdock, lotus root, radish, paprika, bitter gourd, asparagus, carrot, turnip, bamboo shoot, corn, red pepper, tomato, bell pepper, okra, broccoli, cauliflower, shiitake mushroom, onion, garlic, scallion, sweet potato, potato, yam, etc. Specific examples of fruits include pineapple, orange, lemon, mango, strawberry, grape, fig, persimmon, apricot, melon, papaya, banana, citrus junos, cranberry, prune, apple, quince, kiwi, peach, plum, lychee, guava, etc. Among these, from the standpoint of existing dry fruits and use in confectioneries, angelica, rhubarb, ginger, tomato, pineapple, orange, lemon, mango, strawberry, grape, fig, persimmon, apricot, melon, papaya, and banana are well-suited, and the ones fall into the category of fruits are yet particularly suitable.

The sugar alcohol included in the saccharides contained in the sugar preserved vegetable foods according to the present invention comprises 50% to less than 99.5% (unless otherwise stated, "%" refers to "weight %", the same applies hereinafter) maltitol, 0.5% to less than 50% sorbitol, and 5% or less of sugar alcohol with a degree of polymerization of 3. Here, other sugar alcohols may be included as well, as long as the maltitol, sorbitol and sugar alcohol with a degree of polymerization of 3 are within the above ranges.

When maltitol is 99.5% or more and sorbitol is under 0.5%, maltitol crystals precipitate on the surface of the sugar preserved foods that becomes white. The precipitated crystals also produce a crisp crunchy food texture which differs from that obtained when using sucrose and is undesirable. Also, when maltitol is under 50% and sorbitol is 50% or more, or when the sugar alcohol with a degree of polymerization of 3 exceeds 5%, the surface of the sugar preserved foods becomes sticky, which is undesirable.

In the present invention, sugar alcohol should preferably form 50% or more of the saccharides contained in the sugar preserved vegetable foods. There is no problem even if 100% of the saccharides consists of sugar alcohol. Here, the composition of the saccharides contained in the sugar preserved vegetable foods of the present invention can be known by, after sufficiently homogenizing the concerned sugar preserved food in water, collecting the supernatant by centrifugal separation, filtering this supernatant, and analyzing the extraction solution from which impurities were removed by liquid chromatography or an enzymic method. Concretely, the saccharide composition was determined as follows. The sugar preservation immersion syrup and extraction solution of the sugar preserved vegetable foods were analyzed to obtain a chromatogram, using liquid chromatography with RI detectors, with pure water as eluent, with a flow of 0.8 ml/min in a SHODEX SC1011 column (made by SHOWA DENKO K.K.) and at a column temperature of 70° C. A saccharide solution of a known concentration was analyzed beforehand under the same conditions as specimen, and a quantitative determination of the saccharides contained in the sugar preservation immersion syrup and the extraction solution of the sugar preserved vegetable foods was performed based on the area of the obtained chromatogram. Here, because the peaks of maltitol and fructose, and of the sugar alcohol with a degree of polymerization of 3 and glucose overlap each other with the above column, quantitative determination of fructose and glucose was carried out using an enzymic method. The remainder obtained by subtracting the fructose amount obtained from the analysis results with the enzymic method, from the total amount of maltitol and fructose obtained by the liquid chromatography analysis was sought and given as maltitol. And the remainder obtained by subtracting the glucose amount obtained from the enzymic method analysis results from the total amount of the sugar alcohol with a degree of polymerization of 3 and glucose obtained by the liquid chromatography analysis was sought and given as the sugar alcohol with a degree of polymerization of 3. Here, an F-kit manufactured by Roche Ltd., was used for the quantitative determination by enzymic method.

The sugar alcohol contained in the immersion syrup for sugar preserved vegetable foods according to the present invention comprises 50% to less than 99.5% maltitol, 0.5% to less than 50% sorbitol, and 5% or less of sugar alcohol with a degree of polymerization of 3. Here, other sugar alcohols may be included as well, as long as the maltitol, sorbitol and sugar alcohol with a degree of polymerization of 3 are within the above ranges.

In the present invention, sugar alcohol should preferably form 50% or more of the saccharides contained in the immersion syrup for sugar preserved vegetable foods. There is no problem even if 100% of the saccharides consists of sugar alcohol.

When manufacturing sugar preserved vegetable foods using the immersion syrup with the above sugar alcohol composition according to the present invention for vegetable foods, one can obtain sugar preserved vegetable foods having a similar sugar alcohol composition due to osmotic pressure of the immersion syrup.

The sugar concentration of the immersion syrup can easily be known as degrees Brix using a refractometer. In the method for manufacturing sugar preserved vegetable foods according to the present invention, the process of immersion into the immersion syrup may be performed once or more. In the case that the immersion process is performed multiple times, one can use immersion syrups of different sugar concentrations and include immersion processes for immersing the vegetable food raw material in an ascending order starting from the immersion syrup with the lowest sugar concentration. In the present invention, the sugar concentration of these immersion syrups is preferably 30 degrees Brix to 85 degrees Brix. More preferably, the immersion process should be carried out multiple times with immersion syrups having different sugar concentrations within this sugar concentration range so as to facilitate an efficient permeation of the immersion syrup to the inside of the vegetable food raw material.

Also, a process of sprinkling a powdered saccharide may be conducted subsequently to the process of immersion in the immersion syrup. In this case, the saccharide consists of sugar alcohol or sucrose, glucose powder, etc., and it is preferable to select a saccharide that is the component used in the immersion syrup. Here, the amount of powder may be 0.5-15%, preferably 1-10%, and specially preferably 2-8% of the weight of the sugar preserved vegetable food raw material after syrup immersion, when the sugar preserved vegetable food raw material is immersed in the syrup forming the immersion syrup and liquid is drained to an extent that syrup does not drip. If the amount of powder is under 0.5%, stickiness before the drying process increases, causing a deterioration of the workability at the time of transition to the drying process. On the other hand, if the amount of powder exceeds 15%, the powder makes the surface white, causing the appearance to differ from that of standard products using sucrose, and also giving rise to cases when the surface has a sandy food texture.

Modes for Carrying out the Invention

The content of the present invention will be further concretely described hereinbelow based on embodiments.

The technical scope of the present invention is however not limited to the following examples.

Here, the sugar alcohol used when adjusting the immersion syrup for sugar preservation was obtained by adequately formulating maltitol powder (trade name: Lesys), sorbitol powder (trade name: LTS-P), maltitol syrup (trade name: Amalty Syrup), xylitol powder (trade name: Xylit) (all made by Mitsubishi Shoji Foodtech Co., Ltd.), sucrose (trade name: Granule-Sugar made by Dai-Nippon Meiji Sugar Co., Ltd.) to the desired sugar composition, and the syrups indicated in Table 1 were obtained as immersion syrups.

TABLE 1

|  | Sucrose | Xylitol | Sorbitol | Mannitol | Maltitol | Sugar alcohol with polymerization degree of 3 | Sugar alcohol with polymerization degree of 4 or more | Others (Total of mono-sugar alcohol, di-sugar alcohol isomers |
|---|---|---|---|---|---|---|---|---|
| Syrup A | 0.0 | 0.0 | 19.8 | 0.1 | 79.7 | 0.3 | 0.0 | 0.1 |
| Syrup B | 0.0 | 0.0 | 9.9 | 0.0 | 89.6 | 0.4 | 0.0 | 0.1 |
| Syrup C | 0.0 | 0.0 | 0.6 | 0.0 | 91.5 | 4.4 | 3.5 | 0.0 |
| Syrup D | 0.0 | 0.0 | 39.6 | 0.2 | 59.8 | 0.3 | 0.0 | 0.1 |
| Syrup E | 0.0 | 0.0 | 0.0 | 0.0 | 99.6 | 0.4 | 0.0 | 0.0 |
| Syrup F | 0.0 | 0.0 | 1.8 | 0.0 | 75.0 | 12.5 | 10.7 | 0.0 |
| Syrup G | 0.0 | 0.0 | 69.3 | 0.3 | 29.9 | 0.2 | 0.0 | 0.3 |
| Syrup H | 0.0 | 15.0 | 4.9 | 0.1 | 79.7 | 0.3 | 0.0 | 0.1 |
| Syrup I | 20.0 | 0.0 | 7.9 | 0.1 | 71.7 | 0.3 | 0.0 | 0.0 |
| Syrup J | 45.0 | 0.0 | 5.0 | 0.0 | 49.8 | 0.2 | 0.0 | 0.0 |

Sugar composition was determined as indicated above.

Here, glucose, fructose, sucrose, etc., were detected in the sugar preserved vegetable foods at the same time as the saccharides of the immersion syrup for sugar preserved foods, as saccharides that are naturally included in the fresh raw material which forms the sugar preserved vegetable food raw material are still present. Also, polymeric compositions that could not be identified were defined as others.

In the Examples and Comparative Examples, the "moist feeling" and "non-stickiness to the teeth", the "non-stickiness" of the surface and the comprehensive "appearance" of sucrose preserved food were set as criteria to judge the sugar preserved vegetable foods for each of the above items on a scale of 4, the total of all items forming an "over-all judgment" for evaluating the sucrose preserved food-like character. The four-grade evaluation consisted of the four grades of 3, 2, 1, and 0 in the descending order starting with "3" indicating a product equivalent to sucrose preserved food and "0" indicating a product differing from sucrose preserved food.

[1. Pineapple]

The sugar preserved food raw material was prepared by coring and cutting a fresh pineapple in round slices, and appropriately cutting it into bite-size chunks.

Here, the results of a preliminary analysis show that the pineapple used as raw material did not contain sorbitol, maltitol or sugar alcohol with a degree of polymerization of 3.

REFERENCE EXAMPLE 1

Three types of immersion syrup for sugar preserved foods made solely from sucrose were prepared with a sugar concentration of 55° Brix, 75° Brix and 80° Brix respectively. The prepared pineapple underwent an immersion process where it was immersed in the syrups in the ascending order of sugar concentration, was then pulled out from syrup, and was dried in a 60° C. drier after undergoing a process of sprinkling pulverized sucrose on the pineapple, to produce sugar preserved pineapple.

The immersion time was 3 hours each for the first and second syrups, and 16 hours for the third syrup. The sprinkled sucrose was set to 4% of the pineapple weight after syrup immersion, liquid being drained to an extent that syrup does not drip. The processing conditions are summarized in Table 2.

The results of the sugar content analysis of the obtained sugar preserved pineapple are shown in Table 3.

The obtained sugar preserved pineapple had the sweetness of sucrose and had a moist and soft internal food texture that did not stick to the teeth. In addition, the surface was dry without having a powder-like feel, and there were no instances of particles of the sprinkled sucrose or of sticky syrup adhering to the hands. Furthermore, the appearance was that of a small amount of sucrose particles adhering to the surface.

TABLE 2

|  | Syrup | Number of immersion processes | Sugar concentration of syrup (° Brix) | Presence of seed | Seed amount (% by weight) |
|---|---|---|---|---|---|
| Ref. Ex. 1 | Sucrose | 3 | 55→75→80 | Yes | 4% |
| Ex. 1-1 | A | 1 | 80 | Yes | 4% |
| Ex. 1-2 | A | 2 | 60→80 | Yes | 4% |
| Ex. 1-3 | A | 3 | 55→75→80 | Yes | 4% |
| Ex. 1-4 | A | 3 | 55→75→80 | No | — |
| Ex. 1-5 | B | 3 | 40→70→75 | Yes | 8% |
| Ex. 1-6 | C | 3 | 55→75→80 | Yes | 4% |
| Ex. 1-7 | D | 3 | 55→75→80 | Yes | 4% |
| Ex. 1-8 | D | 3 | 55→75→80 | Yes | 2% |
| Ex. 1-9 | D | 3 | 55→75→80 | No | — |
| Ex. 1-10 | H | 1 | 80 | Yes | 4% |
| Ex. 1-11 | I | 3 | 55→75→80 | Yes | 4% |
| Ex. 1-12 | J | 3 | 55→75→80 | Yes | 4% |
| Comp. Ex. 1-1 | E | 3 | 55→75→80 | Yes | 4% |
| Comp. Ex. 1-2 | E | 3 | 55→75→80 | No | — |
| Comp. Ex. 1-3 | F | 3 | 55→75→80 | Yes | 2% |
| Comp. Ex. 1-4 | F | 3 | 55→75→80 | No | — |
| Comp. Ex. 1-5 | G | 3 | 55→75→80 | Yes | 4% |

TABLE 3

| | Glucose | Fructose | Sucrose | Sorbitol | Maltitol | Xylitol | Sugar alcohol with polymerization degree of 3 | Others | Sugar alcohol ratio | Sorbitol in sugar alcohol | Maltitol in sugar alcohol | Xylitol in sugar alcohol | Sugar alcohol with polymerization degree of 3 in sugar alcohol |
|---|---|---|---|---|---|---|---|---|---|---|---|---|---|
| Ref. Ex. 1 | 6.9 | 6.2 | 85.3 | 0.0 | 0.0 | 0.0 | 0.0 | 1.6 | 0.0 | — | — | 0.0 | — |
| Ex. 1-1 | 2.6 | 0.8 | 7.8 | 16.4 | 70.7 | 0.0 | 0.3 | 1.4 | 87.4 | 18.8 | 80.9 | 0.0 | 0.3 |
| Ex. 1-2 | 0.8 | 0.7 | 2.7 | 18.2 | 76.6 | 0.0 | 0.3 | 0.7 | 95.1 | 19.1 | 80.6 | 0.0 | 0.3 |
| Ex. 1-3 | 1.2 | 0.8 | 3.6 | 23.3 | 70.4 | 0.0 | 0.3 | 0.4 | 93.9 | 24.8 | 74.9 | 0.0 | 0.3 |
| Ex. 1-4 | 0.8 | 0.8 | 3.0 | 23.5 | 71.2 | 0.0 | 0.3 | 0.4 | 95.0 | 24.7 | 75.0 | 0.0 | 0.3 |
| Ex. 1-5 | 1.2 | 1.0 | 5.7 | 8.7 | 82.6 | 0.0 | 0.3 | 0.5 | 91.7 | 9.5 | 90.1 | 0.0 | 0.4 |
| Ex. 1-6 | 1.5 | 0.8 | 5.9 | 0.6 | 85.3 | 0.0 | 4.5 | 1.4 | 90.4 | 0.7 | 94.4 | 0.0 | 5.0 |
| Ex. 1-7 | 1.8 | 0.7 | 3.3 | 35.3 | 58.0 | 0.0 | 0.2 | 0.7 | 93.6 | 37.7 | 62.1 | 0.0 | 0.2 |
| Ex. 1-8 | 1.2 | 0.8 | 2.5 | 36.4 | 58.1 | 0.0 | 0.2 | 0.8 | 94.8 | 38.4 | 61.4 | 0.0 | 0.2 |
| Ex. 1-9 | 1.2 | 0.7 | 3.2 | 36.9 | 57.0 | 0.0 | 0.2 | 0.8 | 94.1 | 39.2 | 60.6 | 0.0 | 0.2 |
| Ex. 1-10 | 2.7 | 0.8 | 2.1 | 4.6 | 75.4 | 13.7 | 0.3 | 0.4 | 94.0 | 4.9 | 80.2 | 14.6 | 0.3 |
| Ex. 1-11 | 5.7 | 5.2 | 15.0 | 7.5 | 65.9 | 0.0 | 0.3 | 0.4 | 73.7 | 10.1 | 89.5 | 0.0 | 0.4 |
| Ex. 1-12 | 11.4 | 9.1 | 26.4 | 4.6 | 47.8 | 0.0 | 0.2 | 0.5 | 52.6 | 8.7 | 90.9 | 0.0 | 0.4 |
| Comp. Ex. 1-1 | 1.1 | 0.9 | 3.1 | 0.0 | 94.3 | 0.0 | 0.4 | 0.2 | 94.8 | 0.0 | 99.6 | 0.0 | 0.4 |
| Comp. Ex. 1-2 | 0.5 | 0.7 | 2.7 | 0.0 | 94.9 | 0.0 | 0.4 | 0.8 | 95.3 | 0.0 | 99.6 | 0.0 | 0.4 |
| Comp. Ex. 1-3 | 0.3 | 0.8 | 10.2 | 1.1 | 72.6 | 0.0 | 11.9 | 3.1 | 85.6 | 1.3 | 84.8 | 0.0 | 13.9 |
| Comp. Ex. 1-4 | 1.0 | 0.7 | 9.4 | 1.2 | 72.6 | 0.0 | 11.9 | 3.2 | 85.6 | 1.4 | 84.7 | 0.0 | 13.9 |
| Comp. Ex. 1-5 | 1.6 | 0.9 | 3.3 | 60.0 | 33.3 | 0.0 | 0.1 | 0.8 | 93.5 | 64.2 | 35.7 | 0.0 | 0.1 |

EXAMPLE 1-1

A syrup with the sugar alcohol composition of syrup A in Table 1 was prepared with a sugar concentration of 80° Brix. The prepared pineapple underwent an immersion process where immersion was carried out, then the pineapple that was pulled out from the syrup was dried in a 60° C. drier after undergoing a process where it was sprinkled with maltitol (Lesys made by Mitsubishi Shoji Foodtech Co., Ltd.), to produce sugar preserved pineapple.

The immersion time was 22 hours. During this course, the syrup was heated at the 3rd hour and 6th hour to be boiled down by the amount the sugar concentration had thinned only. The sprinkled maltitol was set to 4% of the pineapple weight after syrup immersion. The processing conditions are summarized in Table 2.

The results of the sugar content analysis of the obtained sugar preserved pineapple are shown in Table 3.

The obtained sugar preserved pineapple had a moist and soft internal food texture that did not stick to the teeth resembling that of the sugar preserved pineapple using sucrose established as reference. In addition, the surface did not have particles of saccharide or sticky syrup adhering to the hands. The appearance, while being slightly more contracted than the sugar preserved pineapple using sucrose established as reference, was that of a small amount of saccharide particles adhering to the surface like the reference product. The evaluation results are shown in Table 4.

EXAMPLE 1-2

The sugar preserved pineapple was obtained in the same manner as in Example 1-1 except that two types of syrup with the sugar alcohol composition of syrup A in Table 1 were prepared with a sugar concentration of 60° Brix and 80° Brix respectively and that the immersion process was carried out so that the prepared pineapple was immersed in the ascending order of sugar concentration of the syrups. The immersion time was 6 hours for the first syrup and 16 hours for the second syrup. During this course, the first syrup was heated midway at the 3rd hour to be boiled down by the amount the sugar concentration had thinned only. The outline of the other processing conditions is summarized in Table 2.

The results of the sugar content analysis of the obtained sugar preserved pineapple are shown in Table 3.

The obtained sugar preserved pineapple had a moist internal food texture that did not stick to the teeth resembling that of the sugar preserved pineapple using sucrose established as reference. In addition, the surface did not have sticky syrup adhering to the hands. The appearance, while being barely more contracted than the sugar preserved pineapple using sucrose established as reference, was that of a small amount of saccharide particles adhering to the surface like the reference product. The evaluation results are shown in Table 4.

EXAMPLE 1-3

The sugar preserved pineapple was obtained in the same manner as in Example 1-1 except that three types of syrup with the sugar alcohol composition of syrup A in Table 1 were prepared with a sugar concentration of 55° Brix, 75° Brix and 80° Brix respectively and that the immersion process was carried out so that the prepared pineapple was immersed in the ascending order of sugar concentration of the syrups. The immersion time was 3 hours each for the first and second syrups, and 16 hours for the third syrup. The outline of the other processing conditions is summarized in Table 2.

The results of the sugar content analysis of the obtained sugar preserved pineapple are shown in Table 3.

The obtained sugar preserved pineapple had a moist and soft internal food texture that did not stick to the teeth resembling that of the sugar preserved pineapple using sucrose established as reference. In addition, the surface did not have particles of saccharide or sticky syrup adhering to the hands. The appearance, like the sugar preserved pineapple using sucrose established as reference, was that of a small amount of saccharide particles adhering to the surface. The evaluation results are shown in Table 4.

EXAMPLE 1-4

The sugar preserved pineapple was obtained in the same manner as in Example 1-3, except that the process of sprinkling maltitol after the process of immersion in syrup was not performed. The outline of the processing conditions is summarized in Table 2.

The results of the sugar content analysis of the obtained sugar preserved pineapple are shown in Table 3.

The obtained sugar preserved pineapple had a moist and soft internal food texture that did not stick to the teeth resembling that of the sugar preserved pineapple using sucrose established as reference. In addition, the surface did not have particles of saccharide or sticky syrup adhering to the hands. The appearance, like the sugar preserved pineapple using sucrose established as reference, was that of a small amount of saccharide particles adhering to the surface. The evaluation results are shown in Table 4.

EXAMPLE 1-5

The sugar preserved pineapple was obtained using a production method similar to that of Example 1-3 except that three types of syrup with the sugar alcohol composition of syrup B in Table 1 were prepared with a sugar concentration of 40° Brix, 70° Brix and 75° Brix respectively and that the sprinkled maltitol was set to 8% of the pineapple weight after syrup immersion. The outline of the processing conditions is summarized in Table 2.

The results of the sugar content analysis of the obtained sugar preserved pineapple are shown in Table 3.

Although one could slightly feel grains of crystals inside, the obtained sugar preserved pineapple had a moist and soft internal food texture that did not stick to the teeth resembling that of the sugar preserved pineapple using sucrose established as reference. In addition, the surface did not have sticky syrup adhering to the hands. While it was slightly covered with a thin white powder layer due to the crystal precipitation of maltitol, the appearance resembled that of the sugar preserved pineapple using sucrose established as reference. The evaluation results are shown in Table 4.

EXAMPLE 1-6

The sugar preserved pineapple was obtained using a production method similar to that of Example 1-3 except that a syrup with the sugar alcohol composition of syrup C in Table 1 was employed. The outline of the processing conditions is summarized in Table 2.

The results of the sugar content analysis of the obtained sugar preserved pineapple are shown in Table 3.

Although the inside was soft and had a somewhat viscous food texture, the obtained sugar preserved pineapple had a moist and soft internal food texture resembling that of the sugar preserved pineapple using sucrose established as reference. In addition, the surface had almost no sticky syrup adhering to the hands after drying. While it had shiny portions looking as if glaze had thinly hardened, the appearance was similar to when sucrose was used. The evaluation results are shown in Table 4.

EXAMPLE 1-7

The sugar preserved pineapple was obtained using a production method similar to that of Example 1-3 except that a syrup with the sugar alcohol composition of syrup D in Table 1 was employed. The outline of the processing conditions is summarized in Table 2.

The results of the sugar content analysis of the obtained sugar preserved pineapple are shown in Table 3.

Although the inside was soft and had a food texture like jelly beans, the obtained sugar preserved pineapple had a moist and soft internal food texture resembling that of the sugar preserved pineapple using sucrose established as reference. In addition, the surface had no sticky syrup adhering to the hands after drying. While it had slightly shiny portions, the appearance was similar to when sucrose was used. The evaluation results are shown in Table 4.

EXAMPLE 1-8

The sugar preserved pineapple was obtained in the same manner as in method in Example 1-7 except that the sprinkled maltitol was set to 2% of the pineapple weight after syrup immersion. The outline of the processing conditions is summarized in Table 2.

The results of the sugar content analysis of the obtained sugar preserved pineapple are shown in Table 3.

Although the inside was soft and had a food texture like jelly beans, the obtained sugar preserved pineapple had a moist and soft internal food texture resembling that of the sugar preserved pineapple using sucrose established as reference. In addition, the surface had no sticky syrup adhering to the hands after drying. While it had slightly shiny portions, the appearance was similar to when sucrose was used. The evaluation results are shown in Table 4.

EXAMPLE 1-9

The sugar preserved pineapple was obtained in the same manner as in Example 1-7 except that the process of sprinkling maltitol after the process of immersion in syrup was not performed. The outline of the processing conditions is summarized in Table 2.

The results of the sugar content analysis of the obtained sugar preserved pineapple are shown in Table 3.

Although the inside was soft and had a food texture like jelly beans, the obtained sugar preserved pineapple had a moist and soft internal food texture resembling that of the sugar preserved pineapple using sucrose established as reference. In addition, the surface had almost no sticky syrup adhering to the hands after drying. While it had slightly shiny portions, the appearance was similar to when sucrose was used. The evaluation results are shown in Table 4.

EXAMPLE 1-10

The sugar preserved pineapple was obtained using a production method similar to that of Example 1-1 except that a syrup with the sugar alcohol composition of syrup H in Table 1 was employed. The outline of the processing conditions is summarized in Table 2.

The results of the sugar content analysis of the obtained sugar preserved pineapple are shown in Table 3.

Although one could slightly feel grains of crystals inside, the obtained sugar preserved pineapple had a moist and soft internal food texture that did not stick to the teeth resembling that of the sugar preserved pineapple using sucrose established as reference. In addition, the surface did not have sticky syrup adhering to the hands. While it was slightly covered with a thin white powder layer due to the crystal precipitation of maltitol and xylitol, the appearance resembled that of the sugar preserved pineapple using sucrose established as reference. The evaluation results are shown in Table 4.

EXAMPLE 1-11

The sugar preserved pineapple was obtained using a syrup with the mixed composition of sucrose and sugar alcohol of syrup I in Table 1, the immersion process was similar to that of Example 1-3 and, after the immersion process where immersion is performed, the pineapple that was pulled out from syrup was subjected to a process of sprinkling a mixed powder of maltitol and pulverized sucrose, then dried in a 60° C. drier. The sprinkled powder was set to 2% maltitol and 2% sucrose with a total of 4% with respect to the pineapple weight after syrup immersion, liquid being drained to an extent that syrup does not drip. The outline of the processing conditions is summarized in Table 2.

The results of the sugar content analysis of the obtained sugar preserved pineapple are shown in Table 3.

The obtained sugar preserved pineapple had a moist and soft internal food texture that did not stick to the teeth resembling that of the sugar preserved pineapple using sucrose established as reference. In addition, the surface did not have particles of saccharide or sticky syrup adhering to the hands. The appearance, similarly to the sugar preserved pineapple using sucrose established as reference, was that of a small amount of saccharide particles adhering to the surface. The evaluation results are shown in Table 4.

EXAMPLE 1-12

The sugar preserved pineapple was obtained in the same manner as in Example 1-11 except that a syrup with the mixed composition of sucrose and sugar alcohol of syrup J in Table 1 was employed. The outline of the processing conditions is summarized in Table 2.

The results of the sugar content analysis of the obtained sugar preserved pineapple are shown in Table 3.

Although the inside was soft and had a somewhat viscous food texture, the obtained sugar preserved pineapple had a moist and soft internal food texture resembling that of the sugar preserved pineapple using sucrose established as reference. In addition, the surface had almost no sticky syrup adhering to the hands after drying. While it had shiny portions looking as if glaze had thinly hardened, the appearance was similar to when sucrose was used. The evaluation results are shown in Table 4.

COMPARATIVE EXAMPLE 1-1

The sugar preserved pineapple was obtained using a production method similar to that of Example 1-3 except that a syrup with the sugar alcohol composition of syrup E in Table 1 was employed. The outline of the processing conditions is summarized in Table 2.

The results of the sugar content analysis of the obtained sugar preserved pineapple are shown in Table 3.

The obtained sugar preserved pineapple had a food texture different from that of the sugar preserved pineapple using sucrose, as maltitol crystals precipitated on the circumference of the sugar preserved food giving a crunchy feel to the food texture of the surface layer, and the internal food texture was that of the vegetable food itself while at the same time the grainy feel of the crystals could be slightly sensed. Furthermore, the inside had a different non-stickiness to the teeth from that of the sugar preserved pineapple using sucrose, with crystals coming into contact with the teeth when chewing. The appearance looked white due to the precipitation of maltitol crystals and had a surface different from that of the sugar preserved pineapple using sucrose. The evaluation results are shown in Table 4.

COMPARATIVE EXAMPLE 1-2

The sugar preserved pineapple was obtained in the same manner as in Comparative Example 1-1 except that the process of sprinkling maltitol after the process of immersion in syrup was not performed. The outline of the processing conditions is summarized in Table 2.

The results of the sugar content analysis of the obtained sugar preserved pineapple are shown in Table 3.

The obtained sugar preserved pineapple had a food texture different from that of the sugar preserved pineapple using sucrose, as maltitol crystals precipitated on the circumference of the sugar preserved food giving a crunchy feel to the food texture of the surface layer, and the internal food texture was that of the vegetable food itself while at the same time the grainy feel of the crystals could be slightly sensed. Furthermore, the inside had a different non-stickiness to the teeth from that of the sugar preserved pineapple using sucrose, with crystals coming into contact with the teeth when chewing. The appearance looked white due to the precipitation of maltitol crystals and had a surface different from that of the sugar preserved pineapple using sucrose. The evaluation results are shown in Table 4.

COMPARATIVE EXAMPLE 1-3

The sugar preserved pineapple was obtained in the same manner as in Example 1-8 except that a syrup with the sugar alcohol composition of syrup F in Table 1 was employed. The outline of the processing conditions is summarized in Table 2.

The results of the sugar content analysis of the obtained sugar preserved pineapple are shown in Table 3.

The surface layer as well as the inside of the obtained sugar preserved pineapple were soft, and the surface layer had the food texture of crystal grains while the internal food texture was viscous, sticking to the teeth. The surface was still slightly sticky after drying and the appearance had portions looking as if having a deposit of glaze, differing from when sucrose is used. The evaluation results are shown in Table 4.

COMPARATIVE EXAMPLE 1-4

The sugar preserved pineapple was obtained in the same manner as in Comparative Example 1-3 except that the process of sprinkling maltitol after the process of immersion in syrup was not performed. The outline of the processing conditions is summarized in Table 2.

The results of the sugar content analysis of the obtained sugar preserved pineapple are shown in Table 3.

The surface layer as well as the inside of the obtained sugar preserved pineapple were soft and had the food texture of crystal grains while the internal food texture was viscous, sticking to the teeth. The surface was still extremely sticky after drying and the appearance had portions looking as if having a deposit of glaze, differing from when sucrose is used. The evaluation results are shown in Table 4.

COMPARATIVE EXAMPLE 1-5

The sugar preserved pineapple was obtained using a production method similar to that of Example 1-3 except that a syrup with the sugar alcohol composition of syrup G in Table 1 was employed. The outline of the processing conditions is summarized in Table 2.

The results of the sugar content analysis of the obtained sugar preserved pineapple are shown in Table 3.

The surface layer as well as the inside of the obtained sugar preserved pineapple were soft and the internal food texture was viscous, sticking to the teeth. The surface was still extremely sticky after drying and the appearance had a luster looking as if having a deposit of glaze, differing from when sucrose is used. The evaluation results are shown in Table 4.

TABLE 4

| Pineapple | Ex. 1-1 | Ex. 1-2 | Ex. 1-3 | Ex. 1-4 | Ex. 1-5 | Ex. 1-6 | Ex. 1-7 | Ex. 1-8 | Ex. 1-9 |
|---|---|---|---|---|---|---|---|---|---|
| Over-all judgement | 11 | 11 | 12 | 12 | 10 | 9 | 10 | 10 | 9 |
| Moist feeling | 3 | 3 | 3 | 3 | 2 | 3 | 3 | 3 | 3 |
| Non-stickiness to the teeth | 3 | 3 | 3 | 3 | 3 | 2 | 2 | 2 | 2 |
| Non-stickiness | 3 | 3 | 3 | 3 | 3 | 2 | 3 | 3 | 2 |
| Appearance | 2 | 2 | 3 | 3 | 2 | 2 | 2 | 2 | 2 |

| Pineapple | Ex. 1-10 | Ex. 1-11 | Ex. 1-12 | Comp. Ex. 1-1 | Comp. Ex. 1-2 | Comp. Ex. 1-3 | Comp. Ex. 1-4 | Comp. Ex. 1-5 |
|---|---|---|---|---|---|---|---|---|
| Over-all judgement | 10 | 12 | 10 | 5 | 5 | 5 | 4 | 4 |
| Moist feeling | 2 | 3 | 3 | 0 | 0 | 3 | 3 | 3 |
| Non-stickiness to the teeth | 3 | 3 | 2 | 2 | 2 | 0 | 0 | 0 |
| Non-stickiness | 3 | 3 | 2 | 3 | 3 | 1 | 0 | 0 |
| Appearance | 2 | 3 | 3 | 0 | 0 | 1 | 1 | 1 |

[2. Orange]

The sugar preserved food raw material was prepared by cutting an orange in round slices with the skin on.

Here, the results of a preliminary analysis show that the orange used as raw material did not contain sorbitol, maltitol or sugar alcohol with a degree of polymerization of 3.

REFERENCE EXAMPLE 2

A commercially available sucrose preserved orange was used as reference. This sucrose preserved orange had the sweetness of sucrose and the food texture of the skin as well as of the pulp part was soft. In addition, the appearance was that of a small amount of dried sucrose particles on the surface, without sticky syrup adhering to the hands.

EXAMPLE 2-1

The sugar preserved orange was obtained using a production method similar to that of Example 1-8.

The results of the sugar content analysis of the obtained sugar preserved orange are shown in Table 5.

The obtained sugar preserved orange had a soft skin and pulp part and had a moist and soft internal food texture that did not stick to the teeth resembling that of the sugar preserved orange using sucrose established as reference. In addition, the surface had no sticky syrup adhering to the hands after drying. While it had slightly shiny portions, the appearance was similar to when sucrose was used. The evaluation results are shown in Table 6.

EXAMPLE 2-2

The sugar preserved orange was obtained in the same manner as in Example 2-1, except that the process of sprinkling maltitol after the process of immersion in syrup was not performed.

The results of the sugar content analysis of the obtained sugar preserved orange are shown in Table 5.

The obtained sugar preserved orange had a food texture and appearance that were almost the same as in Example 2-1, with a soft skin and pulp part, and had a soft internal food texture resembling that of the sugar preserved orange using sucrose established as reference. In addition, the surface had no sticky syrup adhering to the hands after drying. While it had slightly shiny portions, the appearance was similar to when sucrose was used. The evaluation results are shown in Table 6.

COMPARATIVE EXAMPLE 2-1

The sugar preserved orange was obtained using a production method similar to that of Comparative Example 1-3.

The results of the sugar content analysis of the obtained sugar preserved orange are shown in Table 5.

While the obtained sugar preserved orange had a soft skin and pulp part, it had a viscous food texture, sticking to the teeth. Also, the surface was still slightly sticky after drying and the appearance had portions looking as if glaze had thinly hardened, differing from when sucrose is used. The evaluation results are shown in Table 6.

COMPARATIVE EXAMPLE 2-2

The sugar preserved orange was obtained in the same manner as in Comparative Example 2-1, except that the process of sprinkling maltitol after the process of immersion in syrup was not performed.

The results of the sugar content analysis of the obtained sugar preserved orange are shown in Table 5.

While the obtained sugar preserved orange had a soft skin and pulp part, it had a viscous food texture, sticking to the teeth. Also, the surface was still extremely sticky after drying and the appearance had portions looking as if glaze had thinly hardened, differing from when sucrose is used. The evaluation results are shown in Table 6.

TABLE 5

| | Glucose | Fructose | Sucrose | Sorbitol | Maltitol | Sugar alcohol with polymerization degree of 3 | Others | Sugar alcohol ratio | Sorbitol in sugar alcohol | Maltitol in sugar alcohol | Sugar alcohol with polymerization degree of 3 in sugar alcohol |
|---|---|---|---|---|---|---|---|---|---|---|---|
| Ex. 2-1 | 1.5 | 0.7 | 1.8 | 35.8 | 58.2 | 0.2 | 1.8 | 94.3 | 38.0 | 61.8 | 0.2 |
| Ex. 2-2 | 1.1 | 0.7 | 0.6 | 37.8 | 58.0 | 0.2 | 1.6 | 96.1 | 39.4 | 60.4 | 0.2 |
| Comp. Ex. 2-1 | 1.0 | 0.8 | 7.3 | 1.2 | 73.0 | 12.0 | 4.7 | 86.2 | 1.3 | 84.8 | 13.9 |
| Comp. Ex. 2-2 | 1.1 | 0.8 | 7.4 | 1.2 | 73.0 | 12.0 | 4.5 | 86.2 | 1.4 | 84.7 | 13.9 |

TABLE 6

| Orange | Ex. 2-1 | Ex. 2-2 | Comp. Ex. 2-1 | Comp. Ex. 2-2 |
|---|---|---|---|---|
| Over-all judgement | 10 | 10 | 5 | 4 |
| Moist feeling | 3 | 3 | 3 | 3 |
| Non-stickiness to the teeth | 2 | 2 | 0 | 0 |
| Non-stickiness | 3 | 3 | 1 | 0 |
| Appearance | 2 | 2 | 1 | 1 |

[3. Lemon]

The sugar preserved food raw material was prepared by cutting a lemon in round slices with the skin on.

Here, the results of a preliminary analysis show that the lemon used as raw material did not contain sorbitol, maltitol or sugar alcohol with a degree of polymerization of 3.

REFERENCE EXAMPLE 3

A commercially available sucrose preserved lemon was used as reference. This sucrose preserved lemon had the acid taste of lemon and sweetness of sucrose, and the food texture of the skin as well as of the pulp part was soft, without sticking to the teeth. In addition, the appearance was that of a small amount of dried sucrose particles on the surface, without sticky syrup adhering to the hands.

EXAMPLE 3-1

The sugar preserved lemon was obtained using a production method similar to that of Example 1-8.

The results of the sugar content analysis of the obtained sugar preserved lemon are shown in Table 7.

The obtained sugar preserved lemon had a soft skin and pulp part and had a moist and soft internal food texture that did not stick to the teeth resembling that of the sugar preserved lemon using sucrose established as reference. In addition, the surface had no sticky syrup adhering to the hands after drying. While it had slightly shiny portions, the appearance was similar to when sucrose was used. The evaluation results are shown in Table 8.

EXAMPLE 3-2

The sugar preserved lemon was obtained in the same manner as in Example 3-1, except that the process of sprinkling maltitol after the process of immersion in syrup was not performed.

The results of the sugar content analysis of the obtained sugar preserved lemon are shown in Table 7.

The obtained sugar preserved lemon had a food texture and appearance that were almost the same as in Example 3-1, with a soft skin and pulp part, and had a moist and soft internal food texture that did not stick to the teeth resembling that of the sugar preserved lemon using sucrose established as reference. In addition, the surface had no sticky syrup adhering to the hands after drying. While it had slightly shiny portions, the appearance was similar to when sucrose was used. The evaluation results are shown in Table 8.

COMPARATIVE EXAMPLE 3-1

The sugar preserved lemon was obtained using a production method similar to that of Comparative Example 1-3.

The results of the sugar content analysis of the obtained sugar preserved lemon are shown in Table 7.

While the obtained sugar preserved lemon had a soft skin and pulp part, it had a viscous food texture, sticking to the teeth. Also, the surface was still slightly sticky after drying and the appearance had portions looking as if glaze had thinly hardened, differing from when sucrose is used. The evaluation results are shown in Table 8.

COMPARATIVE EXAMPLE 3-2

The sugar preserved lemon was obtained in the same manner as in Comparative Example 3-1, except that the process of sprinkling maltitol after the process of immersion in syrup was not performed.

The results of the sugar content analysis of the obtained sugar preserved lemon are shown in Table 7.

While the obtained sugar preserved lemon had a soft skin and pulp part, it had a viscous food texture, sticking to the teeth. Also, the surface was still extremely sticky after drying and the appearance had portions looking as if glaze had thinly hardened, differing from when sucrose is used. The evaluation results are shown in Table 8.

TABLE 7

| | Glu-cose | Fruc-tose | Su-crose | Sor-bitol | Mal-titol | Sugar alcohol with polymer-ization degree of 3 | Others | Sugar alcohol ratio | Sorbitol in sugar alcohol | Maltitol in sugar alcohol | Sugar alcohol with polymer-ization degree of 3 in sugar alcohol |
|---|---|---|---|---|---|---|---|---|---|---|---|
| Ex. 3-1 | 0.6 | 0.2 | 0.0 | 37.3 | 58.8 | 0.2 | 2.9 | 96.3 | 38.7 | 61.1 | 0.2 |
| Ex. 3-2 | 0.6 | 0.2 | 0.0 | 37.9 | 57.0 | 0.2 | 4.1 | 95.1 | 39.8 | 60.0 | 0.2 |
| Comp. Ex. 3-1 | 0.0 | 0.2 | 6.1 | 1.5 | 74.6 | 12.1 | 5.5 | 88.2 | 1.7 | 84.6 | 13.7 |
| Comp. Ex. 3-2 | 0.4 | 0.2 | 6.3 | 1.5 | 73.8 | 12.1 | 5.7 | 87.4 | 1.7 | 84.4 | 13.9 |

TABLE 8

| Lemon | Ex. 3-1 | Ex. 3-2 | Comp. Ex. 3-1 | Comp. Ex. 3-2 |
|---|---|---|---|---|
| Over-all judgement | 10 | 10 | 5 | 4 |
| Moist feeling | 3 | 3 | 3 | 3 |
| Non-stickiness to the teeth | 2 | 2 | 0 | 0 |
| Non-stickiness | 3 | 3 | 1 | 0 |
| Appearance | 2 | 2 | 1 | 1 |

[4. Mango]

The sugar preserved food raw material was prepared by peeling and pitting a fresh mango, then cutting it into chunks of approximately 50×30×8 mm.

Here, the results of a preliminary analysis show that the mango used as raw material did not contain sorbitol, maltitol or sugar alcohol with a degree of polymerization of 3.

REFERENCE EXAMPLE 4

A commercially available sucrose preserved mango was used as reference. This sucrose preserved mango had the sweetness of sucrose and had a moist and soft internal food texture that did not stick to the teeth. The surface was dry without having a powder-like feel. In addition, there were no instances of sticky syrup adhering to the hands. Furthermore, the appearance was that of a small amount of sucrose particles adhering to the surface.

EXAMPLE 4-1

The sugar preserved mango was obtained using a production method similar to that of Example 1-3.

The results of the sugar content analysis of the obtained sugar preserved mango are shown in Table 9.

The obtained sugar preserved mango had a moist and soft internal food texture that did not stick to the teeth resembling that of the sugar preserved mango using sucrose established as reference. In addition, the surface had no saccharide particles or sticky syrup adhering to the hands. The appearance, like the reference sugar preserved mango using sucrose established as reference, was that of a small amount of saccharide particles adhering to the surface. The evaluation results are shown in Table 10.

COMPARATIVE EXAMPLE 4-1

The sugar preserved mango was obtained using a production method similar to that of Comparative Example 1-1.

The results of the sugar content analysis of the obtained sugar preserved mango are shown in Table 9.

The surface layer of the obtained sugar preserved mango had a crunchy-feel food texture as maltitol crystals precipitated on the circumference of the sugar preserved food, the internal food texture was that of the vegetable food itself while at the same time the grainy feel of the crystals could be slightly sensed. Furthermore, the inside had a different non-stickiness to the teeth from that of the sucrose preserved mango, with crystals coming into contact with the teeth when chewing. The appearance looked white due to the precipitation of maltitol crystals and had a surface different from that of the sugar preserved mango using sucrose. The evaluation results are shown in Table 10.

TABLE 9

| | Glu-cose | Fruc-tose | Su-Grose | Sor-bitol | Mal-titol | Sugar alcohol with polymer-ization degree of 3 | Others | Sugar alcohol ratio | Sorbitol in sugar alcohol | Maltitol in sugar alcohol | Sugar alcohol with polymer-ization degree of 3 in sugar alcohol |
|---|---|---|---|---|---|---|---|---|---|---|---|
| Ex. 4-1 | 1.2 | 1.0 | 2.5 | 18.1 | 76.1 | 0.3 | 0.8 | 94.5 | 19.2 | 80.5 | 0.3 |
| Comp. Ex. 4-1 | 0.4 | 1.0 | 2.8 | 0.0 | 94.6 | 0.4 | 0.8 | 95.0 | 0.1 | 99.5 | 0.4 |

TABLE 10

| Mango | Ex. 4-1 | Comp. Ex. 4-1 |
|---|---|---|
| Over-all judgement | 11 | 5 |
| Moist feeling | 3 | 0 |
| Non-stickiness to the teeth | 3 | 2 |

TABLE 10-continued

| Mango | Ex. 4-1 | Comp. Ex. 4-1 |
|---|---|---|
| Non-stickiness | 3 | 3 |
| Appearance | 2 | 0 |

[5. Strawberry]

The sugar preserved food raw material was prepared by providing a fresh strawberry and a frozen strawberry and respectively cutting them in the lengthwise direction.

Here, the results of a preliminary analysis show that the strawberries used as raw material, fresh as well as frozen, did not contain sorbitol, maltitol or sugar alcohol with a degree of polymerization of 3.

REFERENCE EXAMPLE 5

A commercially available sucrose preserved strawberry was used as reference. This sucrose preserved strawberry had the acid taste of strawberry and sweetness of sucrose, and the internal food texture was soft, without sticking to the teeth. In addition, the appearance was that of a small amount of dried sucrose particles on the surface, without sticky syrup adhering to the hands.

EXAMPLE 5-1

A sugar preserved strawberry was obtained using a production method similar to that of Example 1-8 with the fresh strawberry as sugar preserved food raw material.

The results of the sugar content analysis of the obtained sugar preserved strawberry are shown in Table 11.

Although the inside was soft and had a food texture like jelly beans, the obtained sugar preserved strawberry had a moist and soft food texture that did not stick to the teeth resembling that of the sugar preserved strawberry using sucrose established as reference. In addition, the surface had no sticky syrup adhering to the hands after drying. While it had slightly shiny portions, the appearance was similar to when sucrose was used. The evaluation results are shown in Table 12.

EXAMPLE 5-2

The sugar preserved strawberry was obtained in the same manner as in Example 5-1 except that the process of sprinkling maltitol after the process of immersion in syrup was not performed.

The results of the sugar content analysis of the obtained sugar preserved strawberry are shown in Table 11.

The food texture and appearance of the obtained sugar preserved strawberry were almost the same as in Example 5-1. Although the inside was soft and had a food texture like jelly beans, the obtained sugar preserved strawberry had a moist and soft food texture that did not stick to the teeth resembling that of the sugar preserved strawberry using sucrose established as reference. In addition, the surface had no sticky syrup adhering to the hands after drying. While it had slightly shiny portions, the appearance was similar to when sucrose was used. The evaluation results are shown in Table 12.

EXAMPLE 5-3

A sugar preserved strawberry was obtained using a production method similar to that of Example 5-1, with the frozen strawberry as sugar preserved food raw material.

The results of the sugar content analysis of the obtained sugar preserved strawberry are shown in Table 11.

The food texture and appearance of the obtained sugar preserved strawberry were almost the same as in Example 5-1. Although the inside was soft and had a food texture like jelly beans, the obtained sugar preserved strawberry had a moist and soft food texture that did not stick to the teeth resembling that of the sugar preserved strawberry using sucrose established as reference. In addition, the surface had no sticky syrup adhering to the hands after drying. While it had slightly shiny portions, the appearance was similar to when sucrose was used. The evaluation results are shown in Table 12.

EXAMPLE 5-4

The sugar preserved strawberry was obtained in the same manner as in Example 5-1 except that the process of sprinkling maltitol after the process of immersion in syrup was not performed, with the frozen strawberry as sugar preserved food raw material.

The results of the sugar content analysis of the obtained sugar preserved strawberry are shown in Table 11.

The food texture and appearance of the obtained sugar preserved strawberry were almost the same as in Example 5-1. Although the inside was soft and had a food texture like jelly beans, the obtained sugar preserved strawberry had a moist and soft food texture that did not stick to the teeth resembling that of the sugar preserved strawberry using sucrose established as reference. In addition, the surface had no sticky syrup adhering to the hands after drying. While it had slightly shiny portions, the appearance was similar to when sucrose was used. The evaluation results are shown in Table 12.

TABLE 11

| | Glucose | Fructose | Sucrose | Sorbitol | Maltitol | Sugar alcohol with polymerization degree of 3 | Others | Sugar alcohol ratio | Sorbitol in sugar alcohol | Maltitol in sugar alcohol | Sugar alcohol with polymerization degree of 3 in sugar alcohol |
|---|---|---|---|---|---|---|---|---|---|---|---|
| Ex. 5-1 | 1.6 | 0.5 | 0.5 | 37.0 | 58.9 | 0.2 | 1.3 | 96.1 | 38.5 | 61.3 | 0.2 |
| Ex. 5-2 | 0.7 | 0.5 | 0.3 | 37.5 | 59.4 | 0.2 | 1.4 | 97.2 | 38.6 | 61.2 | 0.2 |
| Ex. 5-3 | 0.9 | 0.5 | 0.6 | 38.2 | 59.1 | 0.2 | 0.5 | 97.6 | 39.1 | 60.7 | 0.2 |
| Ex. 5-4 | 0.1 | 0.5 | 0.5 | 38.9 | 59.4 | 0.2 | 0.4 | 98.5 | 39.5 | 60.3 | 0.2 |

TABLE 12

| Strawberry | Ex. 5-1 | Ex. 5-2 | Ex. 5-3 | Ex. 5-4 |
|---|---|---|---|---|
| Over-all judgement | 9 | 9 | 9 | 9 |
| Moist feeling | 3 | 3 | 3 | 3 |
| Non-stickiness to the teeth | 2 | 2 | 2 | 2 |
| Non-stickiness | 2 | 2 | 2 | 2 |
| Appearance | 2 | 2 | 2 | 2 |

[6. Burdock]

The sugar preserved food raw material was prepared by chopping a burdock into approximately 50 mm long chunks which were cut into four lengthwise direction then parboiled for 10 minutes.

Here, the results of a preliminary analysis show that the burdock used as raw material did not contain sorbitol, maltitol or sugar alcohol with a degree of polymerization of 3.

REFERENCE EXAMPLE 6

A commercially available sucrose preserved burdock was used as reference. This sucrose preserved burdock had the particular taste of burdock and sweetness of sucrose, and the internal food texture was soft, without sticking to the teeth. In addition, the appearance was that of a small amount of dried sucrose particles on the surface, without sticky syrup adhering to the hands.

EXAMPLE 6-1

The sugar preserved burdock was obtained using a production method similar to that of Example 1-7.

The results of the sugar content analysis of the obtained sugar preserved burdock are shown in Table 13.

While one could feel fibers, the obtained sugar preserved burdock had a moist and soft food texture that did not stick to the teeth very much alike that of the sugar preserved burdock using sucrose established as reference. In addition, the surface had no sticky syrup adhering to the hands after drying and the appearance, while there were less particles than the sugar preserved burdock using sucrose, was similar to when sucrose was used. The evaluation results are shown in Table 14.

EXAMPLE 6-2

The sugar preserved burdock was obtained in the same manner as in Example 6-1, except that the process of sprinkling maltitol after the process of immersion in syrup was not performed.

The results of the sugar content analysis of the obtained sugar preserved burdock are shown in Table 13.

The food texture and appearance of the obtained sugar preserved burdock were almost the same as in Example 6-1. While one could feel fibers, the obtained sugar preserved burdock had a moist and soft food texture that did not stick to the teeth very much alike that of the sugar preserved burdock using sucrose established as reference. In addition, the surface had no sticky syrup adhering to the hands after drying and the appearance, while there were less particles than the sugar preserved burdock using sucrose, was similar to when sucrose was used. The evaluation results are shown in Table 14.

TABLE 13

| | Glucose | Fructose | Sucrose | Sorbitol | Maltitol | Sugar alcohol with polymerization degree of 3 | Others | Sugar alcohol ratio | Sorbitol in sugar alcohol | Maltitol in sugar alcohol | Sugar alcohol with polymerization degree of 3 in sugar alcohol |
|---|---|---|---|---|---|---|---|---|---|---|---|
| Ex. 6-1 | 0.1 | 0.6 | 0.3 | 36.4 | 57.2 | 0.2 | 5.2 | 93.9 | 38.8 | 61.0 | 0.2 |
| Ex. 6-2 | 0.1 | 0.6 | 0.2 | 37.7 | 56.4 | 0.2 | 4.8 | 94.3 | 40.0 | 59.8 | 0.2 |

TABLE 14

| Burdock | Ex. 6-1 | Ex. 6-2 |
|---|---|---|
| Over-all judgement | 11 | 11 |
| Moist feeling | 3 | 3 |
| Non-stickiness to the teeth | 3 | 3 |
| Non-stickiness | 3 | 3 |
| Appearance | 2 | 2 |

[7. Lotus Root]

The sugar preserved food raw material was prepared by cutting a lotus root into approximately 7 mm thick round slices which were cut into semicircular shapes then parboiled for 10 minutes.

Here, the results of a preliminary analysis show that the lotus root used as raw material did not contain sorbitol, maltitol or sugar alcohol with a degree of polymerization of 3.

REFERENCE EXAMPLE 7

A commercially available sucrose preserved lotus root was used as reference. This sucrose preserved lotus root had the particular taste of lotus root and sweetness of sucrose, and the internal food texture was soft, without sticking to the teeth. In addition, the appearance was that of a small amount of dried sucrose particles on the surface, without sticky syrup adhering to the hands.

EXAMPLE 7-1

The sugar preserved lotus root was obtained using a production method similar to that of Example 1-7.

The results of the sugar content analysis of the obtained sugar preserved lotus root are shown in Table 15.

While it had a moderate chewy consistence, the obtained sugar preserved lotus root had a moist and soft food texture that did not stick to the teeth resembling that of the sugar preserved lotus root using sucrose established as reference. In addition, the surface had no sticky syrup adhering to the hands after drying and the appearance, while there were less particles than the sugar preserved lotus root using sucrose, was similar to when sucrose was used. The evaluation results are shown in Table 16.

EXAMPLE 7-2

The sugar preserved lotus root was obtained in the same manner as in Example 7-1, except that the process of sprinkling maltitol after the process of immersion in syrup was not performed.

The results of the sugar content analysis of the obtained sugar preserved lotus root are shown in Table 15.

The food texture and appearance of the obtained sugar preserved lotus root were almost the same as in Example 7-1. While it had a moderate chewy consistence, the obtained sugar preserved lotus root had a moist and soft food texture that did not stick to the teeth resembling that of the sugar preserved lotus root using sucrose established as reference. In addition, the surface had no sticky syrup adhering to the hands after drying and the appearance, while there were less particles than the sugar preserved lotus root using sucrose, was similar to when sucrose was used. The evaluation results are shown in Table 16.

TABLE 15

| | Glucose | Fructose | Sucrose | Sorbitol | Maltitol | Sugar alcohol with polymerization degree of 3 | Others | Sugar alcohol ratio | Sorbitol in sugar alcohol | Maltitol in sugar alcohol | Sugar alcohol with polymerization degree of 3 in sugar alcohol |
|---|---|---|---|---|---|---|---|---|---|---|---|
| Ex. 7-1 | 0.1 | 0.3 | 0.4 | 38.4 | 58.3 | 0.2 | 2.3 | 96.9 | 39.7 | 60.1 | 0.2 |
| Ex. 7-2 | 0.2 | 0.3 | 0.6 | 38.9 | 56.8 | 0.2 | 3.0 | 95.9 | 40.6 | 59.2 | 0.2 |

TABLE 16

| Lotus root | Ex. 7-1 | Ex. 7-2 |
|---|---|---|
| Over-all judgement | 11 | 11 |
| Moist feeling | 3 | 3 |
| Non-stickiness to the teeth | 3 | 3 |
| Non-stickiness | 3 | 3 |
| Appearance | 2 | 2 |

PRIOR ART DOCUMENTS

Patent Documents

Patent document 1: Japanese Patent Publication Before Examination No. S62(1987)-244

Patent document 2: Japanese Patent Publication Before Examination No. H10(1998)-33119

The invention claimed is:

1. Sugar preserved vegetable foods that include sugar alcohol as saccharide contained therein, said sugar alcohol comprising 50% to less than 99.5% maltitol, 0.5% to less than 50% sorbitol, and 5% or less of sugar alcohol with a degree of polymerization of 3.

2. The sugar preserved vegetable foods according to claim 1, wherein 50% or more of the saccharides contained in the sugar preserved vegetable foods is sugar alcohol.

3. Immersion syrup for sugar preserved vegetable foods that includes sugar alcohol as saccharide contained therein, said sugar alcohol comprising 50% to less than 99.5% maltitol, 0.5% to less than 50% sorbitol, and 5% or less of sugar alcohol with a degree of polymerization of 3.

4. The immersion syrup for sugar preserved vegetables foods according to claim 3, wherein 50% or more of the saccharides contained in the immersion syrup for sugar preserved vegetables foods is sugar alcohol.

5. Method for manufacturing sugar preserved vegetable foods, wherein drying is conducted after a process of immersing a raw material of sugar preserved vegetable foods into the immersion syrup for sugar preserved vegetable foods according to claim 3.

6. The method for manufacturing sugar preserved vegetable foods according to claim 5, wherein said immersion syrup for sugar preserved vegetable foods has a sugar concentration of between 30 degrees Brix and 85 degrees Brix.

7. The method for manufacturing sugar preserved vegetable foods according to claim 5, wherein a process of sprinkling a powdered saccharide is conducted after said immersion process.

8. The method for manufacturing sugar preserved vegetable foods according to claim 5, wherein said immersion process is characterized in comprising:

(a) a process of immersing the raw material of sugar preserved vegetable foods into the immersion syrup of claim 3, followed by (b) a process of immersing into an immersion syrup for sugar preserved vegetable foods having a sugar concentration higher than that of the immersion syrup for sugar preserved vegetable foods used in process (a).

9. The method for manufacturing sugar preserved vegetable foods according to claim 8, wherein said process (b) is conducted at least twice.

* * * * *